(12) United States Patent
Fujita et al.

(10) Patent No.: US 9,885,424 B2
(45) Date of Patent: Feb. 6, 2018

(54) ELECTROMAGNETIC VALVE

(71) Applicants: HONDA MOTOR CO., LTD., Tokyo (JP); NIDEC TOSOK CORPORATION, Zama-shi, Kanagawa (JP)

(72) Inventors: Akira Fujita, Haga-gun (JP); Hiroaki Ue, Utsunomiya (JP); Fumio Kai, Zama (JP); Tomohiro Yasuda, Zama (JP)

(73) Assignees: Honda Motor Co., Ltd., Tokyo (JP); Nidec Tosok Corporation, Zama-shi (JP)

( * ) Notice: Subject to any disclaimer, the term of this patent is extended or adjusted under 35 U.S.C. 154(b) by 0 days.

(21) Appl. No.: 15/365,083

(22) Filed: Nov. 30, 2016

(65) Prior Publication Data

US 2017/0159843 A1    Jun. 8, 2017

(30) Foreign Application Priority Data

Dec. 3, 2015    (JP) ................................. 2015-236926

(51) Int. Cl.
*F16K 31/08*    (2006.01)
*F16K 31/06*    (2006.01)
(Continued)

(52) U.S. Cl.
CPC .......... *F16K 31/082* (2013.01); *F16K 27/029* (2013.01); *F16K 31/0665* (2013.01);
(Continued)

(58) Field of Classification Search
CPC .. F16K 31/082; F16K 27/029; F16K 31/0675; F16K 31/0665; H01F 7/1646;
(Continued)

(56) References Cited

U.S. PATENT DOCUMENTS 5,752,689 A * 5/1998 Barkhimer .......... F16K 31/0665
251/129.14
5,947,155 A * 9/1999 Miki ................... G05D 16/2013
335/229

(Continued)

FOREIGN PATENT DOCUMENTS

JP    2002-250457    9/2002

*Primary Examiner* — John Bastianelli
(74) *Attorney, Agent, or Firm* — Rankin, Hill & Clark LLP

(57) ABSTRACT

An electromagnetic valve includes: a solenoid having a tubular guide part having the same center as a central axis extending in an axial direction; a movable element disposed inside the guide part and movable in the axial direction; a cover housing the solenoid and the movable element, defining a hole portion, and made of a magnetic material; a pin located at the hole portion and movable along with movement of the movable element; and a valve section provided outside the cover and opened/closed along with movement of the movable element and the pin. The solenoid has a core that surrounds an outer side of the movable element in the radial direction, and a coil that magnetizes the core. The core has an annular ring part surrounding the outer side of the movable element, and tooth parts protruding radially outward from the ring part on which the coil is mounted.

9 Claims, 4 Drawing Sheets

(51) Int. Cl.
  *H01F 7/08* (2006.01)
  *H01F 27/24* (2006.01)
  *H01F 27/26* (2006.01)
  *H01F 27/32* (2006.01)
  *F16K 27/02* (2006.01)
  *H01F 7/16* (2006.01)

(52) U.S. Cl.
  CPC ......... *F16K 31/0675* (2013.01); *H01F 7/081* (2013.01); *H01F 7/1646* (2013.01); *H01F 27/24* (2013.01); *H01F 27/266* (2013.01); *H01F 27/325* (2013.01); *H01F 2007/086* (2013.01)

(58) Field of Classification Search
  CPC ...... H01F 27/325; H01F 27/266; H01F 27/24; H01F 7/081; H01F 2007/086
  USPC .................. 251/65, 129.15, 129.19, 129.14; 335/229, 279, 281, 297
  See application file for complete search history.

(56) References Cited

U.S. PATENT DOCUMENTS

| | | | |
|---|---|---|---|
| 6,598,852 B2 * | 7/2003 | Tomoda | F16K 31/0631 251/129.19 |
| 7,388,461 B2 * | 6/2008 | Ryuen | F16K 31/0631 335/261 |
| 7,641,171 B2 * | 1/2010 | Chinda | F16K 11/044 251/65 |
| 8,127,791 B2 * | 3/2012 | Najmolhoda | F16K 31/062 251/65 |

* cited by examiner

ELECTROMAGNETIC VALVE

CROSS-REFERENCE TO RELATED APPLICATION

Priority is claimed on Japanese Patent Application No. 2015-236926, filed on Dec. 3, 2015, the contents of which are incorporated herein by reference.

BACKGROUND OF THE INVENTION

Field of the Invention

The present invention relates to an electromagnetic valve.

Description of Related Art

A latch type electromagnetic valve equipped with a permanent magnet is disclosed, for instance, in Japanese Unexamined Patent Application, First Publication No. 2002-250457. The electromagnetic valve of Japanese Unexamined Patent Application, First Publication No. 2002-250457 is provided with a coil spring, and thereby maintains a valve-opened state or a valve-closed state in a state in which a current carried to a coil member is obstructed.

SUMMARY OF THE INVENTION

In the electromagnetic valve described above, there is a problem in that the electromagnetic valve is easily enlarged as a coil spring is provided. For example, upon moving from a valve-closed state to a valve-opened state, there is a need to displace a plunger, which is connected to a valve body for opening and closing a flow channel of a fluid, against a spring force of the coil spring. For this reason, there is a problem in that a permanent magnet applying a magnetic force to the plunger is easily enlarged and, as a result, a size of the electromagnetic valve is further easily increased.

In view of the above problems, an aspect of the present invention is directed to providing an electromagnetic valve having a structure which can be miniaturized.

An aspect of an electromagnetic valve of the present invention includes: a solenoid having a tubular guide part having the same center as a central axis extending in an axial direction; a movable element disposed inside the guide part in a radial direction and configured to move in the axial direction; a cover configured to house the solenoid and the movable element, having a hole portion, and made of a magnetic material; a pin located at the hole portion and configured to move along with movement of the movable element; and a valve section provided outside the cover and opened/closed along with movement of the movable element and the pin. The movable element has a permanent magnet, a first yoke located at one side of the permanent magnet in the axial direction, and a second yoke located at the other side of the permanent magnet in the axial direction. The permanent magnet has two magnetic poles disposed in the axial direction. The solenoid has a core that surrounds an outer side of the movable element in the radial direction, and a coil that magnetizes the core. The core has an annular ring part that surrounds the outer side of the movable element in the radial direction, and a plurality of tooth parts which protrude outward from the ring part in the radial direction and on which the coil is mounted.

According to an aspect of the present invention, the electromagnetic valve having a structure which can be miniaturized is provided.

DETAILED DESCRIPTION OF THE INVENTION

Figure 1:
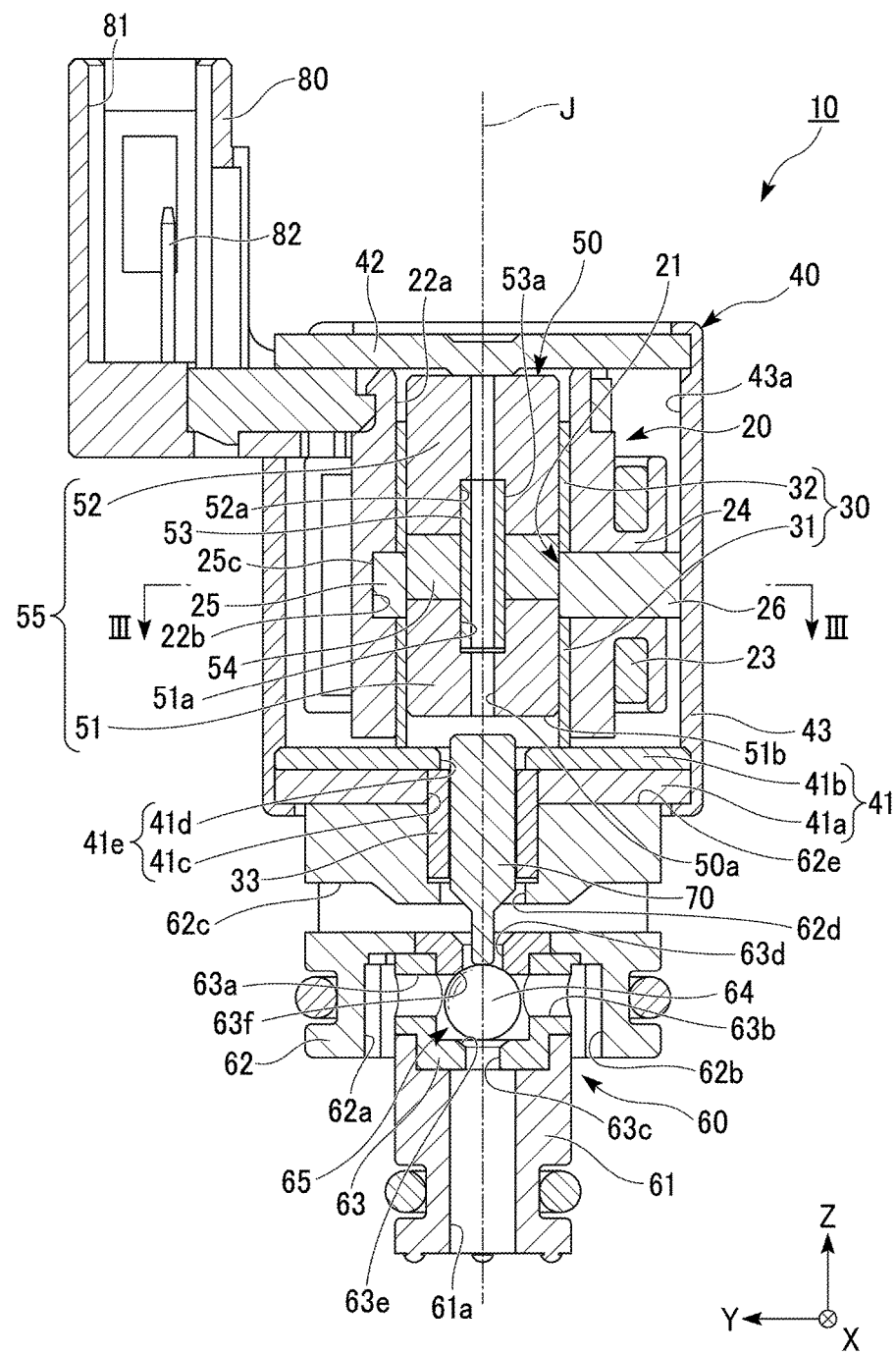
FIG. 1 is a cross-sectional view illustrating an electromagnetic valve of an embodiment of the present invention.

Hereinafter, an electromagnetic valve according to an embodiment of the present invention will be described with reference to the drawings. The scope of the present invention is not limited to the following embodiment, but the embodiment can be arbitrarily modified without departing from the technical spirit of the present invention. An actual structure and each structure may be different from each other in scale or number in the following drawings to facilitate understanding of each constitution.

In the drawings, an XYZ coordinate system is shown as a proper three-dimensional orthogonal coordinate system. In the XYZ coordinate system, a Z-axial direction is set as a direction parallel to an axial direction of a central axis J illustrated in FIG. 1. A Y-axial direction is set as one of directions perpendicular to the Z-axial direction, i.e. a leftward/rightward direction in FIG. 1. An X-axial direction is set as a direction orthogonal to both the Z-axial direction and the Y-axial direction.

In the following description, a negative side (a −Z side or one side in the axial direction) in the Z-axial direction is referred to as a "lower side," and a positive side (a +Z side or the other side in the axial direction) in the Z-axial direction is referred to as an "upper side." The lower and upper sides are merely terms used for description, and do not limit an actual positional relationship or an actual direction. Moreover, unless specifically defined otherwise, the direction (the Z-axial direction) parallel to the central axis J is merely referred to as an "axial direction," a radial direction, the center of which is on the central axis J, is merely referred to as the "radial direction," and a circumferential direction, the center of which is on the central axis J, is merely referred to as the "circumferential direction."

Figure 2:
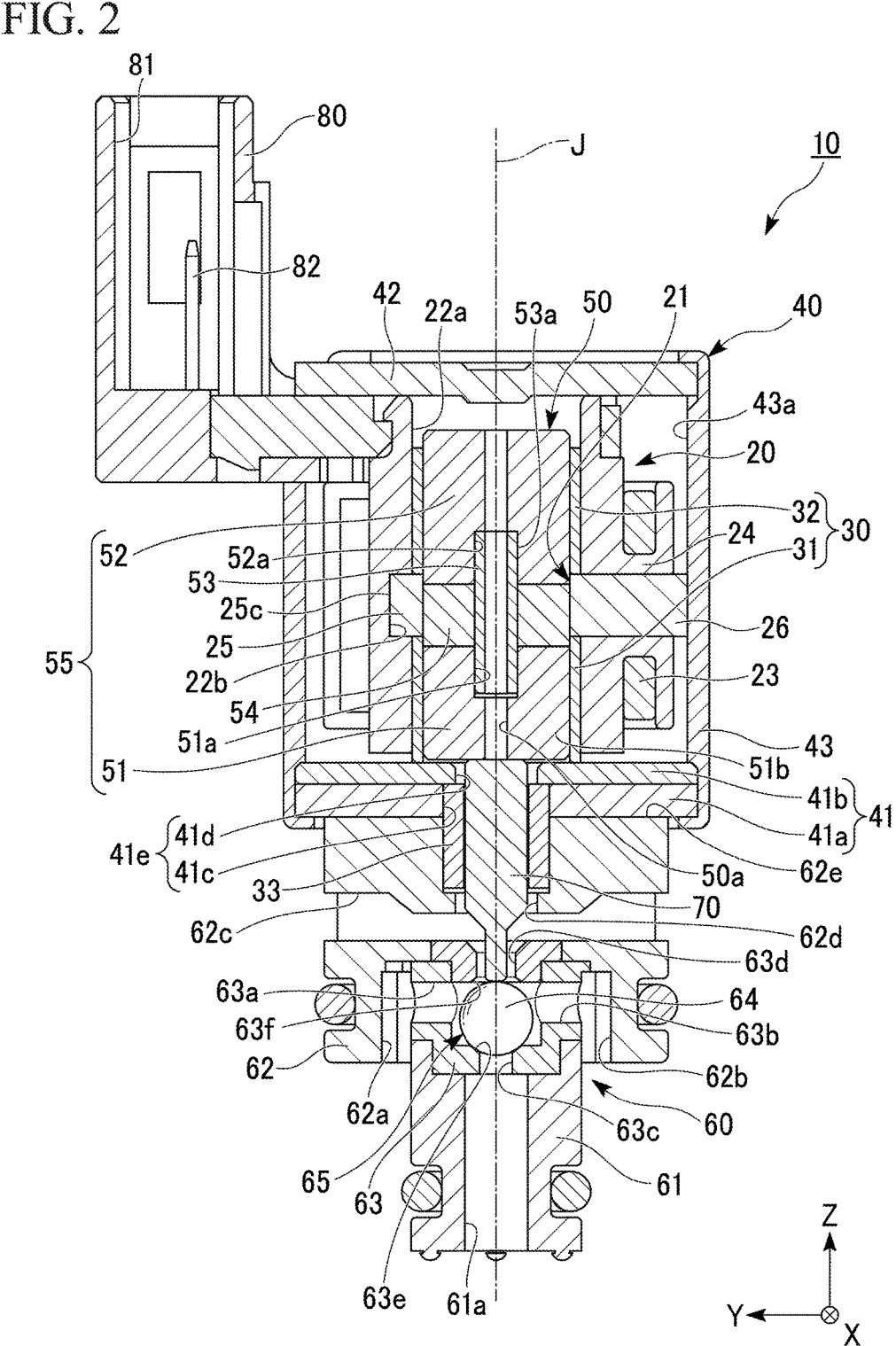
FIG. 2 is a cross-sectional view illustrating the electromagnetic valve of the embodiment.
Figure 3:
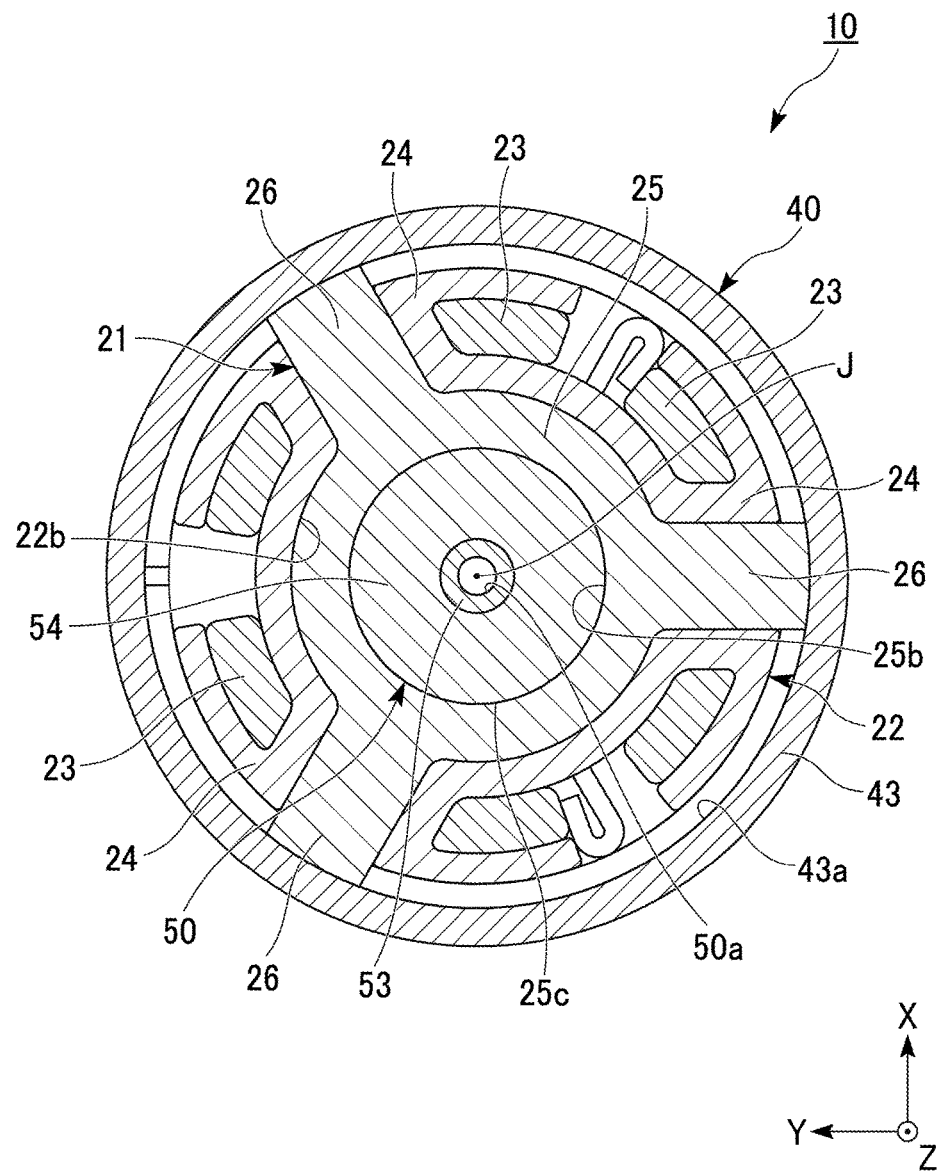
FIG. 3 is a cross-sectional view illustrating the electromagnetic valve of the embodiment and taken along line III-III of FIG. 1.
Figure 4:
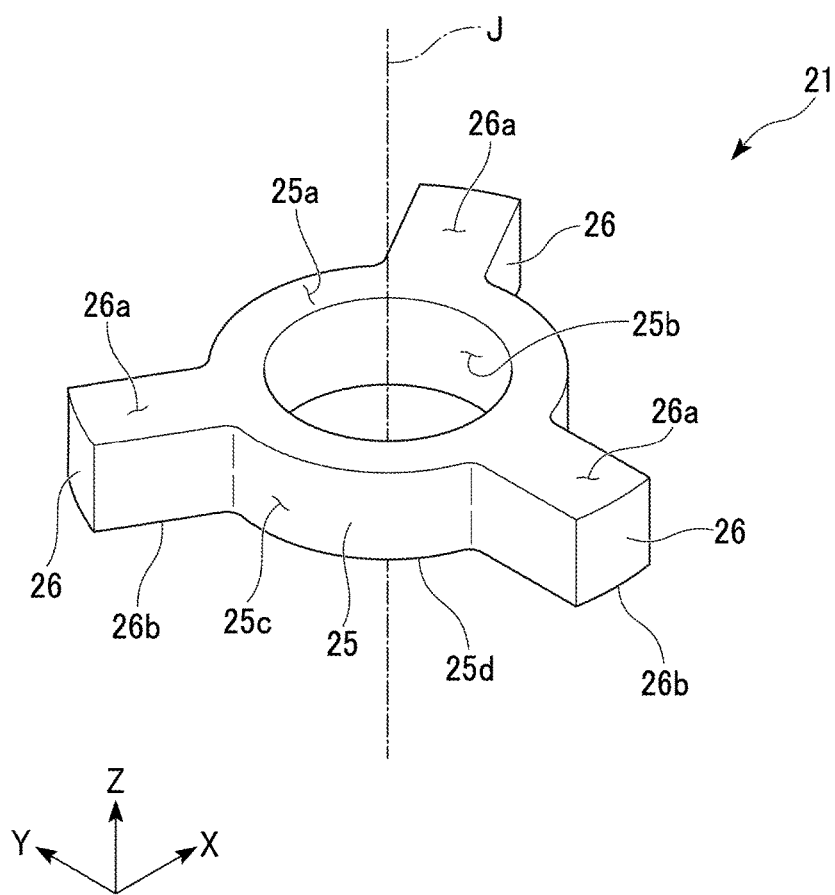
FIG. 4 is a perspective view illustrating a core of the embodiment.

FIGS. 1 to 3 are cross-sectional views illustrating an electromagnetic valve 10 of the present embodiment. FIG. 1 illustrates a state in which a valve section 60 is open. FIG. 2 illustrates a state in which the valve section 60 is closed. FIG. 3 is a cross-sectional view taken along line III-III of FIG. 1. FIG. 4 is a perspective view illustrating a core 21 of the present embodiment.

As illustrated in FIGS. 1 and 2, the electromagnetic valve 10 of the present embodiment is provided with a cover 40, a pin guide member 33, a solenoid 20, a movable element 50, a valve section 60, a pin 70, and a connector section 80. As the solenoid 20 is supplied with a current, a thrust force caused by a magnetic force is applied to the movable element 50, and the movable element 50 moves. The pin 70 moves along with the movement of the movable element 50. The valve section 60 is opened or closed along with the movement of the movable element 50 and the pin 70. Hereinafter, a constitution of each section will be described in detail.

[Cover]

The cover 40 houses the solenoid 20 and the movable element 50. The cover 40 is made of a magnetic material. The cover 40 has a tubular part 43, a lower plate (a first plate) 41, and an upper plate (a second plate) 42.

The tubular part 43 has a tubular shape surrounding an outer side of the solenoid 20 in the radial direction. In the present embodiment, the tubular part 43 is, for instance, in a cylindrical shape having the same center as the central axis J.

The lower plate 41 is located at a lower side (a −Z side) of the solenoid 20. The lower plate 41 is attached to the tubular part 43. In the present embodiment, the lower plate 41 is, for instance, fitted inside the tubular part 43.

In the present embodiment, the lower plate 41 is made up of, for instance, two plates. That is, the lower plate 41 has a first lower plate 41a and a second lower plate 41b. The second lower plate 41b is stacked on an upper side (a +Z side) of the first lower plate 41a. A shape of the first lower plate 41a and a shape of the second lower plate 41b viewed in the axial direction (the Z-axial direction) have, for instance, circular shapes.

The first lower plate 41a is provided with a first hole portion 41c that passes through the first lower plate 41a in the axial direction (the Z-axial direction). The second lower plate 41b is provided with a second hole portion 41d that passes through the second lower plate 41b in the axial direction (the Z-axial direction). A hole portion 41e that passes through the lower plate 41 in the axial direction (the Z-axial direction) is defined by the first and second hole portions 41c and 41d. That is, the cover 40 has the hole portion 41e. The first and second hole portions 41c and 41d are, for instance, in a circular shape having the same center as the central axis J. The second hole portion 41d has a smaller diameter than the first hole portion 41c.

The upper plate 42 is located at an upper side (a +Z side) of the solenoid 20. The upper plate 42 is attached to the tubular part 43. In the present embodiment, the upper plate 42 is, for instance, fitted inside the tubular part 43. A shape of the upper plate 42 viewed in the axial direction (the Z-axial direction) is, for instance, a circular shape.

According to the present embodiment, the lower plate 41, the upper plate 42, and the tubular part 43 are separate members. For this reason, when the electromagnetic valve 10 is assembled, the solenoid 20 and the movable element 50 are easily housed inside the cover 40. Thus, the electromagnetic valve 10 can be easily assembled.

[Pin Guide Member]

The pin guide member 33 is a tubular member supported by the cover 40. The pin guide member 33 is made of a non-magnetic material. The pin guide member 33 is fitted into the first hole portion 41c of the first lower plate 41a. An upper end of the pin guide member 33 is in contact with a lower surface of the second lower plate 41b.

The pin guide member 33 is, for instance, open at opposite ends thereof in the axial direction (the Z-axial direction), and has a cylindrical shape having the same center as the central axis J. That is, in the present embodiment, the pin guide member 33 extends in the axial direction. The pin 70 is inserted inside the pin guide member 33. The pin guide member 33 movably holds the pin 70. In the present embodiment, since the pin guide member 33 extends in the axial direction, the pin 70 moves in the axial direction.

[Solenoid]

The solenoid 20 is located at an inner side of the tubular part 43 in the radial direction. The solenoid 20 has an insulator 22, the core 21, a coil 23, and a guide bush (a guide part) 30.

The insulator 22 has a tubular shape surrounding an outer side of the movable element 50 in the radial direction. The insulator 22 is made of, for instance, a resin. The insulator 22 has a plurality of bobbin parts 24. As illustrated in FIG. 3, in the present embodiment, the insulator 22 has, for instance, three bobbin parts 24. The bobbin parts 24 are provided at regular intervals in the circumferential direction. The coil 23 is wound around the bobbin parts 24.

As illustrated in FIGS. 1 and 2, an insulator inner circumferential surface 22a, which is an inner surface of the insulator 22 in the radial direction, is provided with a support recess 22b that is recessed toward an outer side in the radial direction. The insulator 22 is made by, for instance, insert molding in which the core 21 is inserted into a metal mold.

In this specification, the inner surface of the insulator 22 includes surfaces which face an inner side of the insulator 22 in the radial direction among surfaces of the insulator 22. That is, the inner surface of the insulator 22 includes the insulator inner circumferential surface 22a and a bottom surface of the support recess 22b, i.e. an outer surface of the support recess 22b in the radial direction.

The core 21 is made of a magnetic material. The core 21 is located at the outer side of the movable element 50 in the radial direction. In the present embodiment, as illustrated in FIG. 3, the core 21 has a ring part 25 and a plurality of tooth parts 26.

The ring part 25 is located at an inner side of the insulator 22. The ring part 25 has an annular shape surrounding the outside of the movable element 50 in the radial direction. That is, the core 21 surrounds the outer side of the movable element 50 in the radial direction. A ring part inner surface 25b, which is an inner surface of the ring part 25 in the radial direction, is opposite to the movable element 50.

The ring part 25 has, for instance, an annular shape having the same center as the central axis J. For this reason, it is easy to equalize distances between the plurality of tooth parts 26 protruding from the ring part 25 and the movable element 50 in the radial direction to each other. Thus, a magnetic force applied to the movable element 50 by a magnetic circuit (to be described below) passing through the tooth parts 26 is easily made uniform in the circumferential direction.

As illustrated in FIGS. 1 and 2, the ring part 25 is, for instance, fitted into the support recess 22b of the insulator 22. A ring part outer surface 25c that is an outer surface of the ring part 25 in the radial direction is opposite to the bottom surface of the support recess 22b. That is, the ring part outer surface 25c is opposite to the inner surface of the insulator 22. The ring part outer surface 25c is in contact with the bottom surface of the support recess 22b.

As illustrated in FIG. 4, ring part end faces 25a and 25d of the ring part 25 are flat surfaces. The ring part end face 25a is an end face of an upper side (a +Z side) of the ring part 25 in the axial direction. The ring part end face 25d is an end face of a lower side (a −Z side) of the ring part 25 in the axial direction. That is, the ring part end faces 25a and 25d of the ring part 25 in the axial direction (the Z-axial direction) are flat surfaces.

The tooth parts 26 protrude outward from the ring part 25 in the radial direction. Shapes of the tooth parts 26 are not particularly restricted, and may be columnar shapes, polygonal shapes, or other shapes. In the example of FIG. 4, the tooth parts 26 have, for instance, approximately quadrangular prism shapes.

As illustrated in FIGS. 1 and 2, the tooth parts 26 pass into the bobbin parts 24 of the insulator 22. The coil 23 is wound around the tooth parts 26 via the bobbin parts 24. That is, the coil 23 is mounted on the tooth parts 26.

According to the present embodiment, the ring part outer surface 25c is provided to face the inner surface of the insulator 22, and the plurality of tooth parts 26 extending outward from the ring part 25 in the radial direction pass into the bobbin parts 24. For this reason, the core 21 is supported by the insulator 22 and is stably held.

Outer ends of the tooth parts 26 in the radial direction protrude outward from the bobbin parts 24 in the radial direction. The outer ends of the tooth parts 26 in the radial direction are, for instance, fixed to a tubular part inner surface 43a that is an inner surface of the tubular part 43 of the cover 40 in the radial direction. That is, the outer ends of the tooth parts 26 in the radial direction are fixed to the cover 40. For this reason, it is easy to form the magnetic circuit (to be described below) passing through the core 21 and the cover 40.

As illustrated in FIG. 3, in the present embodiment, three or more tooth parts 26 are provided. In the example of FIG. 3, for example, three of the tooth parts 26 are provided. For this reason, the core 21 can be firmly fixed to the cover 40. In addition, the core 21 is stably supported by the insulator 22.

The plurality of tooth parts 26 are provided at regular intervals in the circumferential direction. For this reason, the magnetic force applied to the movable element 50 by the magnetic circuit (to be described below) passing through the tooth parts 26 is easily made uniform in the circumferential direction. In addition, the core 21 can be more stably fixed to the cover 40.

As illustrated in FIG. 4, tooth part end faces 26a and 26b of the tooth part 26 are flat surfaces. The tooth part end face 26a is an end face of an upper side (a +Z side) of the tooth part 26 in the axial direction. The tooth part end face 26b is an end face of a lower side (a −Z side) of the tooth part 26 in the axial direction. That is, the tooth part end faces 26a and 26b of the tooth part 26 in the axial direction (the Z-axial direction) are flat surfaces.

The ring part end face 25a and the tooth part end face 26a are provided on the same plane. The ring part end face 25d and the tooth part end face 26b are provided on the same plane. For this reason, the core 21 of the present embodiment can be made by punching a plate-like magnetic material member using a press. Therefore, the core 21 can be easily made. In the present embodiment, the same plane on which the ring part end face 25a and the tooth part end face 26a are provided and the same plane on which the ring part end face 25d and the tooth part end face 26b are provided are, for instance, surfaces parallel to an XY plane.

In the present embodiment, the ring part 25 and the tooth parts 26 are a single member. For this reason, in comparison with a case in which the tooth parts 26 of separate members are fixed to the ring part 25, relative positional accuracy between the plurality of tooth parts 26 can be improved. As a method of manufacturing the core 21, the aforementioned method of punching a plate-like magnetic material member using a press may be adopted.

As illustrated in FIGS. 1 and 2, the coil 23 is mounted on the tooth parts 26 of the core 21 via the bobbin parts 24 of the insulator 22. The coil 23 magnetizes the core 21.

As illustrated in FIGS. 1 and 2, the guide bush 30 has a tubular shape having the same center as the central axis J, extending in the axial direction (the Z-axial direction). The guide bush 30 has, for instance, a cylindrical shape. The guide bush 30 is made of a non-magnetic material. In the present embodiment, the guide bush 30 includes a lower guide bush (a first guide part) 31 and an upper guide bush (a second guide part) 32.

The lower guide bush 31 is provided at a lower side (a −Z side) of the core 21. The upper guide bush 32 is provided at an upper side (a +Z side) of the core 21. For this reason, the core 21 can be configured to directly face the movable element 50. Thereby, a magnetic force between the magnetized core 21 and the movable element 50 is easily used as a thrust force of the movable element 50 in the axial direction (the Z-axial direction). The magnetic circuit (to be described below) caused by a permanent magnet 54 passing through the core 21 is easily formed.

The lower guide bush 31 and the upper guide bush 32 are fitted into the tubular insulator 22. A lower end of the lower guide bush 31 is in contact with an upper surface of the second lower plate 41b of the lower plate 41. An upper end of the lower guide bush 31 is in contact with a lower surface of the core 21. A lower end of the upper guide bush 32 is in contact with an upper surface of the core 21.

[Movable Element]

The movable element 50 is disposed inside the guide bush 30 of the solenoid 20 in the radial direction. In the present embodiment, the movable element 50 has, for instance, a columnar shape. The movable element 50 moves along the guide bush 30 in the axial direction (the Z-axial direction). The movable element 50 has a connecting member 53, the permanent magnet 54, and a yoke 55. In the present embodiment, the yoke 55 includes a first yoke 51 and a second yoke 52. That is, the movable element 50 has the first yoke 51 and the second yoke 52.

The connecting member 53 connects the permanent magnet 54, the first yoke 51, and the second yoke 52. In the present embodiment, the connecting member 53 has a tubular shape extending in the axial direction (the Z-axial direction). The connecting member 53 is made of a non-magnetic material.

The permanent magnet 54 has, for instance, an annular shape. The permanent magnet 54 is fixed to an outer surface 53a of the outside of the connecting member 53 in the radial direction. The permanent magnet 54 is fixed, for instance, by being fit into the outside of the connecting member 53 in the radial direction. The permanent magnet 54 has two magnetic poles, i.e. N and S poles, disposed in the axial direction (the Z-axial direction).

The first yoke 51 is located at a lower side (a −Z side) of the permanent magnet 54. The second yoke 52 is located at an upper side (a +Z side) of the permanent magnet 54. That is, the yoke 55 is disposed at a position different from that of the permanent magnet 54 in the axial direction (the Z-axial direction). Each of the first yoke 51 and the second yoke 52 is in contact with the permanent magnet 54. In the present embodiment, the first yoke 51 and the second yoke 52 are separate members.

The first yoke 51 has a first recess 51a recessed toward the lower side (the −Z side) in an upper surface thereof. The second yoke 52 has a second recess 52a recessed toward the upper side (the +Z side) in a lower surface thereof. An inner surface of the first recess 51a and an inner surface of the second recess 52a are fixed to the outer surface 53a of the outside of the connecting member 53 in the radial direction. In the present embodiment, a lower end of the connecting member 53 is fitted into the first recess 51a. In the present embodiment, an upper end of the connecting member 53 is fitted into the second recess 52a.

The movable element 50 is provided with a through-hole 50a that passes through the movable element 50 in the axial direction (the Z-axial direction). That is, the through-hole 50a passes through the permanent magnet 54 and the yoke 55 in the axial direction. The through-hole 50a extends, for instance, in a linear shape in the axial direction. A cross-sectional shape of the through-hole 50a has, for instance, a circular shape having the same center as the central axis J. The through-hole 50a is made up of a hole portion provided for the first yoke 51, an inner portion of the connecting member 53, and a hole portion provided for the second yoke 52.

[Valve Section]

The valve section 60 is provided outside the cover 40. The valve section 60 is attached at a lower side (a −Z side) of the cover 40. The valve section 60 has a first nozzle member 61, a second nozzle member 62, a valve chamber member 63, and a valve body 64. The valve chamber member 63 has a valve chamber 65 therein. The valve body 64 is housed in the valve chamber 65. The valve body 64 is, for instance, a spherical body.

The first nozzle member 61 is attached at a lower side (a −Z side) of the valve chamber member 63. The first nozzle member 61 is provided with an inner port 61a that passes therethrough in the axial direction. The inner port 61a is an inflow port of a fluid. A lower end of the inner port 61a is, for instance, connected to a pump (not shown). An upper end of the inner port 61a can communicate with the valve chamber 65 of the valve chamber member 63.

The second nozzle member 62 is fixed to the lower surface of the lower plate 41 of the cover 40. The second nozzle member 62 is provided with outer ports 62a and 62b and a drain port 62c. The outer ports 62a and 62b are outflow ports of the fluid. The outer ports 62a and 62b are, for instance, open at the lower side (the −Z side). The outer port 62a communicates with the valve chamber 65 of the valve chamber member 63. The drain port 62c passes through, for instance, the second nozzle member 62 in the radial direction (the Y-axial direction). The drain port 62c can communicate with the valve chamber 65. The drain port 62c is open to the atmosphere.

The second nozzle member 62 is provided with a fitting hole portion 62d that penetrates from a nozzle member upper surface 62e of the second nozzle member 62 to the drain port 62c in the axial direction (the Z-axial direction). The pin guide member 33 is fitted into the fitting hole portion 62d.

The valve chamber member 63 is attached to the second nozzle member 62. The valve chamber member 63 is located between the first nozzle member 61 and the second nozzle member 62 in the axial direction (the Z-axial direction). The valve chamber member 63 is provided with outer port-communicating hole portions 63a and 63b, an inner port-communicating hole portion 63c, and a drain port-communicating hole portion 63d.

The outer port-communicating hole portions 63a and 63b connect the valve chamber 65 and the outer ports 62a and 62b. The inner port-communicating hole portion 63c can connect the valve chamber 65 and the inner port 61a. An upper end of the inner port-communicating hole portion 63c is provided with a lower valve seat portion 63e. The drain port-communicating hole portion 63d can connect the valve chamber 65 and the drain port 62c. A lower end of the drain port-communicating hole portion 63d is provided with an upper valve seat portion 63f.

[Pin]

The pin 70 is located at a hole portion 41e. The pin 70 is held by the pin guide member 33 to be movable in the axial direction (the Z-axial direction). The pin 70 has, for instance, a columnar shape extending in the axial direction (the Z-axial direction). A lower end of the pin 70 is provided with a small diameter portion whose diameter is reduced. The pin 70 passes through the fitting hole portion 62d and the drain port 62c in the axial direction (the Z-axial direction), and extends up to the drain port-communicating hole portion 63d of the valve chamber member 63. An upper end of the pin 70 can come into contact with a lower end of the movable element 50. A lower end of the pin 70 can come into contact with the valve body 64.

[Connector Section]

The connector section 80 is attached to the cover 40. The connector section 80 is provided with a connector opening 81 that is open at the upper side (the +Z side). The connector section 80 has a connecting terminal 82. One end of the connecting terminal 82 protrudes from a bottom surface of the connector opening 81. Although not illustrated, the other end of the connecting terminal 82 is electrically connected to the coil 23. An external power supply (not shown) is connected to the connector section 80. The external power supply supplies a current to the coil 23 via the connecting terminal 82.

Hereinafter, an operation of the electromagnetic valve 10 of the present embodiment will be described. First, magnetic circuits generated at the electromagnetic valve 10 will be described.

For example, when one magnetic pole disposed at the upper side (the +Z side) is set to an N pole and the other magnetic pole disposed at the lower side (the −Z side) is set to an S pole among the magnetic poles of the permanent magnet 54, magnetic flux of the permanent magnet 54 is discharged from the upper surface of the permanent magnet 54 into the second yoke 52. The magnetic flux discharged into the second yoke 52 returns back to the permanent magnet 54 from the lower surface sequentially via the upper plate 42, the tubular part 43, the lower plate 41, and the first yoke 51.

Thereby, a magnetic circuit is formed, and the first yoke 51, the second yoke 52, and the cover 40 formed of a magnetic material are magnetized. A mutually attractive magnetic force is generated between the magnetized first yoke 51 and the lower plate 41. A mutually attractive magnetic force is generated between the magnetized second yoke 52 and the upper plate 42.

In addition to the magnetic circuit, in the state shown in FIG. 1, a magnetic circuit in which the magnetic flux discharged into the second yoke 52 returns back to the permanent magnet 54 sequentially via the upper plate 42, the tubular part 43, and the core 21 is formed. For this reason, in the state shown in FIG. 1, the magnetic force between the second yoke 52 and the upper plate 42 is greater than the magnetic force between the first yoke 51 and the lower plate 41. Thereby, even in a state in which no current is supplied to the coil 23, the valve section 60 can maintain the state of FIG. 1, i.e. the opened state.

On the other hand, in the state shown in FIG. 2, a magnetic circuit in which the magnetic flux discharged into the second yoke 52 returns back to the permanent magnet 54 sequentially via the core 21, the tubular part 43, the lower plate 41, and the first yoke 51 is formed. For this reason, in the state shown in FIG. 2, the magnetic force between the first yoke 51 and the lower plate 41 is greater than the magnetic force between the second yoke 52 and the upper plate 42. Thereby, even in the state in which no current is supplied to the coil 23, the valve section 60 can maintain the state of FIG. 2, i.e. the closed state.

For this reason, according to the present embodiment, because it is not necessary to supply current to the coil 23 to maintain the valve section 60 in the opened state and the closed state, power consumption of the electromagnetic valve 10 can be reduced.

Next, an opening/closing operation of the valve section 60 in the present embodiment will be described. In the state in which the valve section 60 illustrated in FIG. 1 is opened, an upper surface of the movable element 50, i.e. an upper surface of the second yoke 52, is in contact with the upper plate 42. A lower surface 51b of the first yoke 51 and an upper surface of the pin 70 are separated in the axial direction (the Z-axial direction).

In the state in which the valve section 60 is opened, the valve body 64 and the pin 70 are maintained to be pushed upward toward the upper side (the +Z side) by a pressure of a fluid flowing into the inner port 61a. Thereby, the inner port 61a and the outer ports 62a and 62b communicate with each other via the inner port-communicating hole portion 63c, the valve chamber 65, and the outer port-communicating hole portions 63a and 63b. Therefore, a fluid flowing from the inner port 61a into the valve section 60 flows from the outer ports 62a and 62b to the outside of the valve section 60. The valve body 64 pushed upward by the fluid flowing into the inner port 61a is fitted onto the upper valve seat portion 63f and blocks the drain port-communicating hole portion 63d.

In the state in which the valve section 60 is opened, when a current flows to the coil 23, magnetic flux is generated from the coil 23. The magnetic flux generated from the coil 23 is, for instance, directed from the inside to the outside of the coil 23 in the radial direction. That is, the magnetic flux generated from the coil 23 moves, for instance, in the tooth parts 26 from the inside to the outside in the radial direction. The magnetic flux moving in the tooth parts 26 is divided and moves to the upper side (the +Z side) and the lower side (the −Z side) of the tubular part 43 from portions where the tooth parts 26 and the tubular part 43 are in contact with each other. The magnetic flux moving upward along the tubular part 43 returns back to the tooth parts 26 via the upper plate 42 and the second yoke 52. The magnetic flux moving downward along the tubular part 43 returns back to the tooth parts 26 via the lower plate 41 and the first yoke 51. In this way, the current flows to the coil 23, and thereby a magnetic circuit of the coil 23 is formed.

In the magnetic circuit of the coil 23, the magnetic flux flows from the upper side (the +Z side) toward the lower side (the −Z side) at the upper plate 42 and the second yoke 52. That is, the flow of the magnetic flux in the upper plate 42 and the second yoke 52 due to the magnetic circuit of the coil 23 has a reversed direction with respect to the flow of the magnetic flux in the upper plate 42 and the second yoke 52 due to the aforementioned magnetic circuit of the permanent magnet 54. For this reason, the magnetic flux caused by the magnetic circuit of the coil 23 and the magnetic flux caused by the magnetic circuit of the permanent magnet 54 are mutually weakened in the upper plate 42 and the second yoke 52. Thereby, the magnetic force between the second yoke 52 and the upper plate 42 is reduced.

On the other hand, in the magnetic circuit of the coil 23, the magnetic flux flows from the lower side (the −Z side) toward the upper side (the +Z side) at the lower plate 41 and the first yoke 51. That is, the flow of the magnetic flux in the lower plate 41 and the first yoke 51 due to the magnetic circuit of the coil 23 has the same direction as the flow of the magnetic flux in the lower plate 41 and the first yoke 51 due to the aforementioned magnetic circuit of the permanent magnet 54. For this reason, the magnetic flux caused by the magnetic circuit of the coil 23 and the magnetic flux caused by the magnetic circuit of the permanent magnet 54 are mutually strengthened in the lower plate 41 and the first yoke 51. Thereby, the magnetic force between the first yoke 51 and the lower plate 41 is increased.

As a result, the magnetic force between the second yoke 52 and the upper plate 42 is weaker than the magnetic force between the first yoke 51 and the lower plate 41. Therefore, the movable element 50 is attracted toward the lower plate 41, and moves to the lower side (the −Z side) in the guide bush 30. If the movable element 50 moves to the lower side, the lower surface 51b of the movable element 50 comes into contact with the upper end of the pin 70. Thereby, the movable element 50 moves to the lower side, and the pin 70 is pushed down to the lower side.

As illustrated in FIG. 2, if the pin 70 is pushed down to the lower side (the −Z side), the lower end of the pin 70 pushes the valve body 64 down to the lower side. Thereby, the valve body 64 is fitted onto the lower valve seat portion 63e and blocks the inner port-communicating hole portion 63c. As a result, a flow of the fluid between the inner port 61a and the outer ports 62a and 62b is obstructed, and the valve section 60 is in the closed state.

In the state in which the valve section 60 is closed, the drain port-communicating hole portion 63d is opened. For this reason, the outer ports 62a and 62b and the drain port 62c communicate with each other. A fluid left behind in the outer ports 62a and 62b at a high pressure flows to the drain port 62c. Since the drain port 62c is open to the atmosphere, a pressure of the fluid flowing into the drain port 62c is reduced.

In this way, the valve section 60 can be changed from the opened state to the closed state. Here, after the valve section 60 is transitioned to the closed state shown in FIG. 2, even if current supplied to the coil 23 is stopped as described above, the state of the valve section 60 is maintained in the state of FIG. 2. In this case, the magnetic force between the first yoke 51 and the lower plate 41 is greater than a force obtained by the sum of the magnetic force between the second yoke 52 and the upper plate 42 and a push-up force of the fluid which is transmitted to the movable element 50 via the valve body 64 and pin 70.

A direction of the current supplied to the coil 23 when the valve section 60 is changed from the closed state to the opened state is reversed with respect to that when the valve section 60 is changed from the opened state to the closed state. Thereby, since the magnetic circuit of the coil 23 is formed in the reverse direction compared to when the valve section 60 is changed from the opened state to the closed state, the magnetic flux in the first yoke 51 and the lower plate 41 is weakened and the magnetic flux in the second yoke 52 and the upper plate 42 is strengthened. As a result, the magnetic force between the second yoke 52 and the upper plate 42 is greater than the magnetic force between the first yoke 51 and the lower plate 41, and the movable element 50 is attracted to the upper plate 42.

When the movable element 50 moves to the upper side (the +Z side), the valve body 64 and the pin 70 are pushed upward by the pressure of the fluid flowing into the inner port 61a. Thereby, the inner port 61a and the outer ports 62a and 62b communicate with each other via the inner port-communicating hole portion 63c, the valve chamber 65, and the outer port-communicating hole portions 63a and 63b, and the valve section 60 is opened again. After the valve section 60 is transitioned to the opened state shown in FIG. 1, even if current supplied to the coil 23 is stopped as described above, the state of the valve section 60 is maintained in the state of FIG. 1.

As described above, the pin 70 moves along with the movement of the movable element 50, and the valve section 60 is opened or closed. That is, the valve section 60 is opened or closed along with the movement of the movable element 50 and the pin 70.

According to the present embodiment, the movable element 50 housed in the cover 40 made of a magnetic material has the permanent magnet 54, the first yoke 51 located at the lower side of the permanent magnet 54, and the second yoke 52 located at the upper side of the permanent magnet 54. The permanent magnet 54 has two magnetic poles disposed in the axial direction. For this reason, in the way described above, the movable element 50 can be displaced in the axial direction by the magnetic circuit based on the permanent magnet 54 and the magnetic circuit based on the coil 23. In addition, since the magnetic circuit is formed differently according to whether the valve section 60 is in the opened state or the closed state, even if current is not supplied to the coil 23, the valve section 60 is maintained in the opened or closed state.

Therefore, according to the present embodiment, the movable element 50 can be displaced without using a coil spring, and the valve section 60 can be maintained in the opened or closed state even in the state in which current carried to the coil 23 is obstructed. For this reason, the entire electromagnetic valve 10 is miniaturized since a coil spring is not provided. As a coil spring is not provided, the magnetic force applied to the movable element 50 can be reduced by the permanent magnet 54. Thereby, the permanent magnet 54 can be miniaturized and, as a result, the entire electromagnetic valve 10 can be further miniaturized. In this way, according to the present embodiment, the electromagnetic valve 10 having a structure that can be miniaturized can be obtained.

Like the present embodiment, in a constitution in which the core 21 of the solenoid 20 surrounds the outside of the movable element 50 in the radial direction, for example, when the core 21 does not have the ring part 25, the plurality of tooth parts 26 are each provided as separate members. For this reason, it is difficult to accurately position a relative position between the tooth parts 26. When the relative position between the tooth parts 26 deviates, the magnetic force applied to the movable element 50 is not made uniform in the circumferential direction. Thereby, it is easy to greatly incline the thrust force applied to the movable element 50 toward the central axis J, and the movable element 50 is pressed against the guide bush 30. As a result, there is a concern that the guide bush 30 is worn, and the movable element 50 is not normally displaced.

In contrast, according to the present embodiment, since the core 21 has the ring part 25, the ring part 25 can connect the plurality of tooth parts 26. Thereby, it is easy to accurately position a relative position between the tooth parts 26. As a result, the magnetic force applied to the movable element 50 by the core 21 is easily made uniform in the circumferential direction, and the thrust force applied to the movable element 50 easily follows the central axis J.

In the present embodiment, the following constitution may be adopted.

In the present embodiment, the number of tooth parts 26 is not particularly restricted, and may be two or four or more. The tooth parts 26 may be separate members independent of the ring part 25.

In the above description, the first yoke 51, the second yoke 52, and the permanent magnet 54 are configured to be fitted into the connecting member 53, but the present embodiment is not limited thereto. In the present embodiment, for example, the outer surface 53a of the connecting member 53, the first recess 51a of the first yoke 51, the second recess 52a of the second yoke 52, and the inner surface of the permanent magnet 54 may be provided with threaded portions. The threaded portions of the first yoke 51, the second yoke 52, and the permanent magnet 54 are fitted to the threaded portion of the connecting member 53, and thereby the first yoke 51, the second yoke 52, and the permanent magnet 54 may be fixed to the outer surface 53a of the connecting member 53.

In the present embodiment, the first yoke 51 and the second yoke 52 may be formed as a single member. In addition, in the present embodiment, the permanent magnet 54 may be divided in the circumferential direction.

Each of the aforementioned constitutions can be appropriately combined within extents that are not inconsistent with each other.

What is claimed is:

1. An electromagnetic valve, comprising:
a solenoid having a tubular guide part having the same center as a central axis extending in an axial direction;
a movable element disposed inside the guide part in a radial direction and configured to move in the axial direction;
a cover configured to house the solenoid and the movable element, having a hole portion, and made of a magnetic material;
a pin located at the hole portion and configured to move along with movement of the movable element; and
a valve section provided outside the cover and opened/closed along with movement of the movable element and the pin,
wherein the movable element has a permanent magnet, a first yoke located at one side of the permanent magnet in the axial direction, and a second yoke located at the other side of the permanent magnet in the axial direction,
the permanent magnet has two magnetic poles disposed in the axial direction,
the solenoid has a core that surrounds an outer side of the movable element in the radial direction, and a coil that magnetizes the core, and
the core has an annular ring part that surrounds the outer side of the movable element in the radial direction, and a plurality of tooth parts which protrude outward from the ring part in the radial direction and on which the coil is mounted.

2. The electromagnetic valve according to claim 1, wherein three or more of the tooth parts are provided, and the tooth parts are provided at regular intervals in a circumferential direction.

3. The electromagnetic valve according to claim 1, wherein the ring part has an annular shape that is concentric with the central axis.

4. The electromagnetic valve according to claim 1, wherein the ring part and the tooth parts are a single member.

5. The electromagnetic valve according to claim 1, wherein:
ring part end faces of the ring part in the axial direction and tooth part end faces of each of the tooth parts in the axial direction are flat surfaces; and
the ring part end faces and the tooth part end faces are provided on the same planes.

6. The electromagnetic valve according to claim 1, wherein the guide part includes a first guide part provided at one side of the core in the axial direction, and a second guide part provided at the other side of the core in the axial direction.

7. The electromagnetic valve according to claim 1, wherein outer ends of the tooth parts in the radial direction are fixed to the cover.

8. The electromagnetic valve according to claim 1, wherein:
   the solenoid has a tubular insulator that surrounds the outer side of the movable element in the radial direction;
   the insulator has a plurality of bobbin parts around which the coil is wound;
   the coil is mounted on the tooth parts via the bobbin parts; and
   an outer surface of an outside of the ring part in the radial direction faces an inner surface of the insulator.

9. The electromagnetic valve according to claim 1, wherein the cover has a tubular part that surrounds an outer side of the solenoid in the radial direction, a first plate that is located at one side of the solenoid in the axial direction and is attached to the tubular part, and a second plate that is located at the other side of the solenoid in the axial direction and is attached to the tubular part.

\* \* \* \* \*